(12) United States Patent
Eyeson

(10) Patent No.: US 11,632,464 B2
(45) Date of Patent: Apr. 18, 2023

(54) COMMUNICATIONS ARBITRATOR

(71) Applicant: Isaac K. Eyeson, Broomfield, CO (US)

(72) Inventor: Isaac K. Eyeson, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 586 days.

(21) Appl. No.: 14/258,848

(22) Filed: Apr. 22, 2014

(65) Prior Publication Data

US 2015/0304492 A1    Oct. 22, 2015

(51) Int. Cl.
*H04M 3/51* (2006.01)

(52) U.S. Cl.
CPC .................. *H04M 3/5175* (2013.01)

(58) Field of Classification Search
CPC ............. H04M 3/5183; H04M 3/5191; H04M 3/5166; H04M 3/51
USPC ............... 379/265.01, 265.02, 265.1, 265.11
See application file for complete search history.

(56) References Cited

U.S. PATENT DOCUMENTS

| | | | | |
|---|---|---|---|---|
| 5,596,634 A * | 1/1997 | Fernandez | ............... | H04M 3/42 379/207.12 |
| 5,937,051 A * | 8/1999 | Hurd | .................. | H04M 3/5183 379/212.01 |
| 6,430,597 B1 * | 8/2002 | Dilip | ...................... | G06Q 10/10 709/202 |
| 6,853,716 B1 * | 2/2005 | Shaffer | ................... | H04M 3/56 370/260 |
| 8,370,155 B2 | 2/2013 | Byrd et al. | | |
| 8,386,252 B2 * | 2/2013 | Michaelis | .............. | G09B 19/04 704/231 |
| 8,848,879 B1 * | 9/2014 | Coughlan | ............... | H04M 1/57 379/88.12 |
| 2002/0039408 A1 * | 4/2002 | Hall | ....................... | G06Q 10/10 379/90.01 |
| 2004/0249636 A1 * | 12/2004 | Applebaum | ........ | G10L 15/1822 704/231 |

(Continued)

FOREIGN PATENT DOCUMENTS

EP    1109119 A2 *  6/2001  .......... H04M 3/5191

OTHER PUBLICATIONS

"Posts Tagged 'Auto-suggest': The Avaya Aura Contact Center 6.1: Outshining the Competition," Advanced Communication Solutions, Sep. 13, 2012, [retrieved on Jul. 10, 2014], 4 pages. Retrieved from: www.buytelephonesystem.com/blog/tag/auto-suggest/.

*Primary Examiner* — Ahmad F. Matar
*Assistant Examiner* — Jirapon Intavong
(74) *Attorney, Agent, or Firm* — Sheridan Ross P.C.

(57) ABSTRACT

Content of a communication session, such as a voice communication between a user and an agent of a contact center is monitored. A keyword, a phrase, an emotion, or a gesture related to a topic in the monitored content of the communication session is identified. A rule based on the identified the monitored content is applied. In response to applying the rule based on the monitored content, one or more topic suggestions are identified and presented to the user. For example, the rule can detect that the agent changed the discussion from a first topic to a second topic. In response to the agent discussing the second topic, the user is presented with two topics suggestions for the two topics. The user can select one of the topic suggestions to focus the agent on a specific topic suggestion. The selected topic suggestion along with discussions options are then displayed to the agent.

20 Claims, 5 Drawing Sheets

(56) References Cited

U.S. PATENT DOCUMENTS

| | | | |
|---|---|---|---|
| 2006/0177040 A1* | 8/2006 | Mitra | G06Q 10/0637 |
| | | | 379/266.01 |
| 2008/0269958 A1* | 10/2008 | Filev | B60W 50/10 |
| | | | 701/1 |
| 2011/0010173 A1* | 1/2011 | Scott | H04M 3/42221 |
| | | | 704/235 |
| 2011/0010637 A1* | 1/2011 | Schneider | G06Q 10/107 |
| | | | 715/752 |
| 2011/0208660 A1* | 8/2011 | Erbey | G06Q 30/016 |
| | | | 705/304 |
| 2012/0224020 A1* | 9/2012 | Portman | H04M 3/5133 |
| | | | 348/14.02 |
| 2014/0241519 A1* | 8/2014 | Watson | H04M 3/5175 |
| | | | 379/265.06 |

\* cited by examiner

COMMUNICATIONS ARBITRATOR

TECHNICAL FIELD

The systems and methods disclosed herein relate to contact centers and in particular to managing communications in a contact center.

BACKGROUND

There are many forms of conversation that can occur between a customer and an agent in a contact center. The conversation may be in the form of a call, a chat, an email, combinations thereof, etc. Independent of the type of media being used, communication difficulties can arise between the customer and the agent. These communication difficulties can include misunderstandings between the customer and the agent, conversation drift to tangential subjects, lack of expertise on a subject by the agent, language barriers, and other communication challenges. These communication difficulties may lead to an unproductive or distressed conversation between the customer and the agent.

A typical mechanism for a contact center to manage these types of conversations is to get a supervisor involved. For example, if the agent is taking to long to resolve a customer's problem on a voice call, the agent's supervisor may be conferenced into the voice call to expedite resolution of the customer's problem. In many cases, when the supervisor is conferenced in, the customer is already frustrated. Conferencing the supervisor into a call that is already going badly often leads to reduced customer satisfaction. In addition, constantly having to involve a supervisor in conversations is not only time consuming and expensive, but it is also requires additional resources that cannot be used to handle other communications. The end result is higher costs with reduced customer satisfaction.

SUMMARY

Systems and methods are provided to solve these and other problems and disadvantages of the prior art. Content of a communication session, such as a voice communication between a user and an agent of a contact center is monitored. A keyword a phrase, an emotion, and/or a gesture related to a topic in the monitored content of the communication session is identified. A rule based on the identified the keyword, phrase, emotion, and/or gesture is applied. In response to applying the rule based on the keyword phrase, emotion, and/or gesture, one or more topic suggestions are identified and presented to the user. For example, the rule can detect that the agent changed the discussion from a first topic to a second topic. In response to the agent discussing the second topic, the user is presented with two topics suggestions for the two topics. The user can select one of the topic suggestions to focus the agent on a specific topic suggestion. The selected topic suggestion along with discussions options are then displayed to the agent.

DETAILED DESCRIPTION

Figure 1:
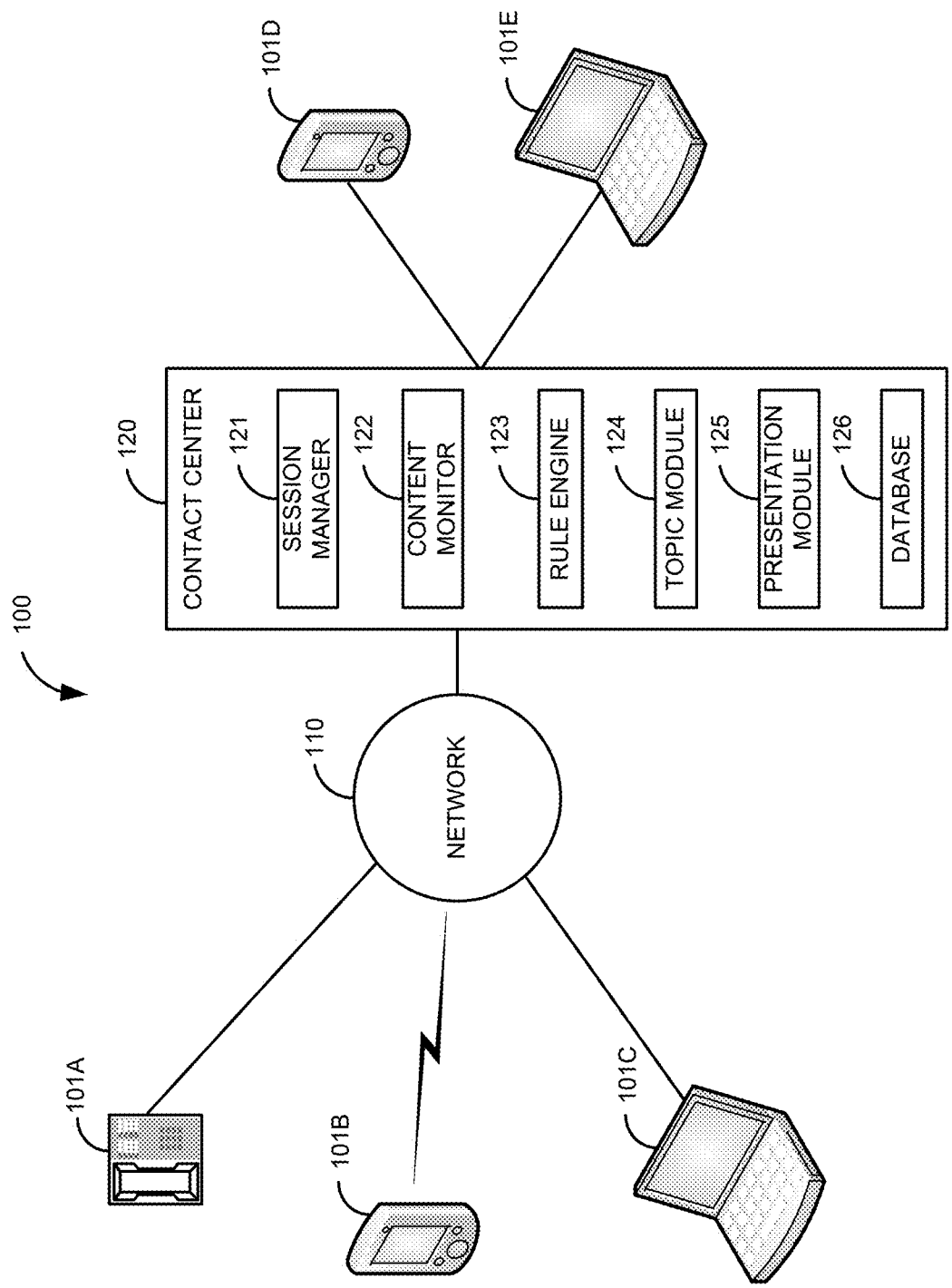
FIG. 1 is a block diagram of a first illustrative system for identifying topics in a communication session.

FIG. 1 is a block diagram of a first illustrative system 100 for identifying topics in a communication session. The first illustrative system 100 comprises communication endpoints 101A-101E, a network 110, and a contact center 120.

The communication endpoints 101A-101E can be or may include any communication endpoint 101 that can communicate on the network 110, such as a Personal Computer (PC), a telephone, a video phone, a cellular telephone, a Personal Digital Assistant (PDA), a tablet device, a notebook device, a smart phone, and/or the like. FIG. 1 shows five communication endpoints 101A-101E. However, any number of communication endpoints 101 may be connected to the network 110 and the contact center 120, including only a single communication endpoint 101 being connected to the network 110 and a single communication endpoint 101 being connected to the contact center 120.

The network 110 can be or may include any network 110 that can send and receive information, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Integrated Services Digital Network (ISDN), email protocols, video protocols, text messaging protocols, and the like.

The contact center 120 can be or may include any system that handles contacts from customers or users, such as a call center. The contact center 120 can handle a variety of communications, such as, voice communication sessions, video communication sessions, text communications, email communications, Instant Messaging communications, and/or the like. The contact center 120 comprises a session manager 121, a content monitor 122, a rule engine 123, a topic module 124, a presentation module 125, and a database 126. In this example, the elements 121-126 are all shown in the contact center 120. However, in other embodiments, the elements 121-126 may be distributed in the network 110 and/or in the communication endpoints 101A-101E. For example, the presentation module 125 may be in the contact center 120 and/or the communication endpoints 101A-101E.

The session manager 121 can be or may include any hardware/software that can handle communication sessions, such as a Private Branch Exchange (PBX), a central office switch, a Session Initiation Protocol (SIP) switch, a router, a proxy server, and/or the like. The session manager 121 is shown in the contact center 120. However, in other embodiments, the session manager 121 may be distributed in the network 110 or within the communication endpoints 101A-101E.

The content monitor 122 can be or may include any hardware/software that can monitor content of a communication session. The content monitor 122 can monitor content of communication sessions, such as content in a video communication session, content in a voice communication session, content of a text communication session, content of an email communication session, content of an Instant Messaging session, and/or the like.

The rule engine 123 can be or may include any hardware/software that can apply defined rules. The rule engine 123 can, for example, apply rules stored in the database 126.

The topic module 124 can be or may include any hardware/software that that can identify topics in a communication session. The topic module 124 can generate topic suggestions based on the identified topics.

The presentation module 125 can be or may include any hardware/software that can generate and/or present information to a user or agent. For example, the presentation module 125 may be a video card, a monitor, a LED display, a plasma display, a television, a web server, an Interactive Voice Response (IVR) system, a speaker, a software application, a Digital Signaling Processor (DSP), a video processor, and/or the like.

The database 126 can be or may include any type of database 126 for storing information, such as a relational database, a file, a file system, a directory service, an objected oriented database, and/or the like. The database 126 may include various types of information, such as defined rules, topic suggestions, configuration information, contact information, and/or the like.

The content monitor 122 monitors content of a communication session between a user at the communication endpoint 101B and an agent of the contact center 120 at the communication endpoint 101E. The communication session can be any type of communication session, such as, a voice communication session, a video communication session, a text communication session, a email communication session, an Instant Messaging communication session, and/or the like. The content monitor 122 identifies a keyword, a phrase, an emotion, and/or a gesture related to a topic in the monitored content of the communication session. For example, the content monitor 122 monitors a voice communication session and identifies the phrase "Avaya Aura" and the phrase "satisfaction" in the communication session where the customer says he wants to purchase a circuit pack for the "Avaya Aura" product. The phrase "Avaya Aura" is related to the topic Avaya Aura. Alternatively, the content monitor 122 can monitor the communication session for an emotion, such as anger or excitement. In another embodiment, the content monitor can monitor the communication session for a gesture, such as the user pointing to a manual, the user shaking his head to indicate that the user does not agree (or agrees) with the agent when discussing a topic, the user having a perplexed look when discussing a topic and/or the like The rule engine 123 applies one or more rules based on the identified keyword, phrase, emotion, and/or gesture. The one or more rules can include various types of rules. The one or more rules can be applied as the communication session progresses. For example, a first rule can be applied to a first identified phrase spoken at the beginning of the communication session and a second rule can be applied to a second identified phrase spoken later on in the communication session.

The rules can be applied based on any individual that communicates in the communication session. For example, one rule could be based on the user speaking and one rule could be based on the agent speaking. A third rule could be based on an agent supervisor speaking in a conferenced communication session. Alternatively, a rule may be based on multiple users/agents speaking. For example, a rule may be based on two users that call in from a single communication endpoint 101 or based on conferencing in a second agent into the communication session.

The one or more rules can be based on a single word or phrase, based on a combination of words/phrases, based on the words/phrases being communicated in the same sentence, based on the words/phrases being in a single email or text, based on the words/phrases being communicated within a specific time period, based on a non-response to an IVR system, based on the same word/phrase being communicated a defined number of times, based on an abbreviation, based on a specific type of punctuation used with a specific word or phrase, based on a determination that the agent is not understanding a topic or is discussing a different topic, based on a gesture made during the communication session, based on a emotion made during the communication session, based on a gesture while waiting to be connected to the agent, and/or the like.

The topic module 124 generates a first topic suggestion for presentation to and/or selection by the user in response to the applied rule. This process can be repeated to generate additional topic suggestions that are presented to the user. The user can then select one of the topic suggestions. In response to receiving the selection of a topic suggestion, the topic module 124 generates for presentation to the agent, the topic suggestion along with one or more discussion options associated with the selected topic suggestion.

To illustrate the above process, consider the following non-limiting example. The content monitor 122 monitors content of a voice communication session between a contact center agent and customer. The customer states that he is satisfied with the Avaya Aura communication system. The customer also states that he needs to purchase a new XYX circuit pack. The rule engine 123 applies a first rule that requires the phrase "Avaya Aura" and the phrase "satisfaction" in the same sentence spoken by the customer. The rule engine 123 applies a second rule that requires the word "purchase" and the phrase "XYX circuit pack" in the same sentence. Based on the two rules, the rule engine 123 generates two topic suggestions for selection by the customer that states "Satisfaction with Avaya Aura" and "Purchase of XYX circuit pack."

The two topic suggestions are presented to the customer via a display on communication endpoint 101B that is generated (e.g., via a web server (presentation module 125)) and displayed to the customer. The customer can then select the topic "Purchase of XYX circuit pack" via a touch screen in communication endpoint 101B. The topic suggestion "Purchase of XYX circuit pack" is displayed to the contact center agent along with the discussion options: 1) purchase a new XYX circuit pack, 2) Purchase a used XYX circuit pack, and 3) Purchase extended warranty. The agent can then use the discussion options to better handle specifically what the customer wants to discuss. Later on, the customer could select the "Satisfaction with Avaya Aura" topic suggestion and the agent would be presented with a different set of discussion options associated with the topic "Satisfaction with Avaya Aura."

Alternatively, instead of displaying the topic suggestions in a display, the topic suggestions can be presented to the customer via an IVR system. The customer could select an individual topic suggestion via pressing a key on a keypad on the communication endpoint 101B. This would work where the communication endpoint 101 does not have a display (e.g. communication endpoint 101A).

In another embodiment, additional topic suggestions can be identified based on information stored in the database 126. For example, a second topic can be identified based on a previous communication session to the contact center 120. The second topic can be displayed along with the first topic.

In another embodiment, topic suggestions can be provided by the user prior to the initiation of the communication session. For example, the customer could provide the topic suggestions via a web site before calling into the contact center 120.

At the conclusion of the communication session, information associated with the communication session can be stored in the database 126. The stored information associated with the communication session can be used to identify additional topics the next time the customer communicates with the contact center 120.

Figure 2:
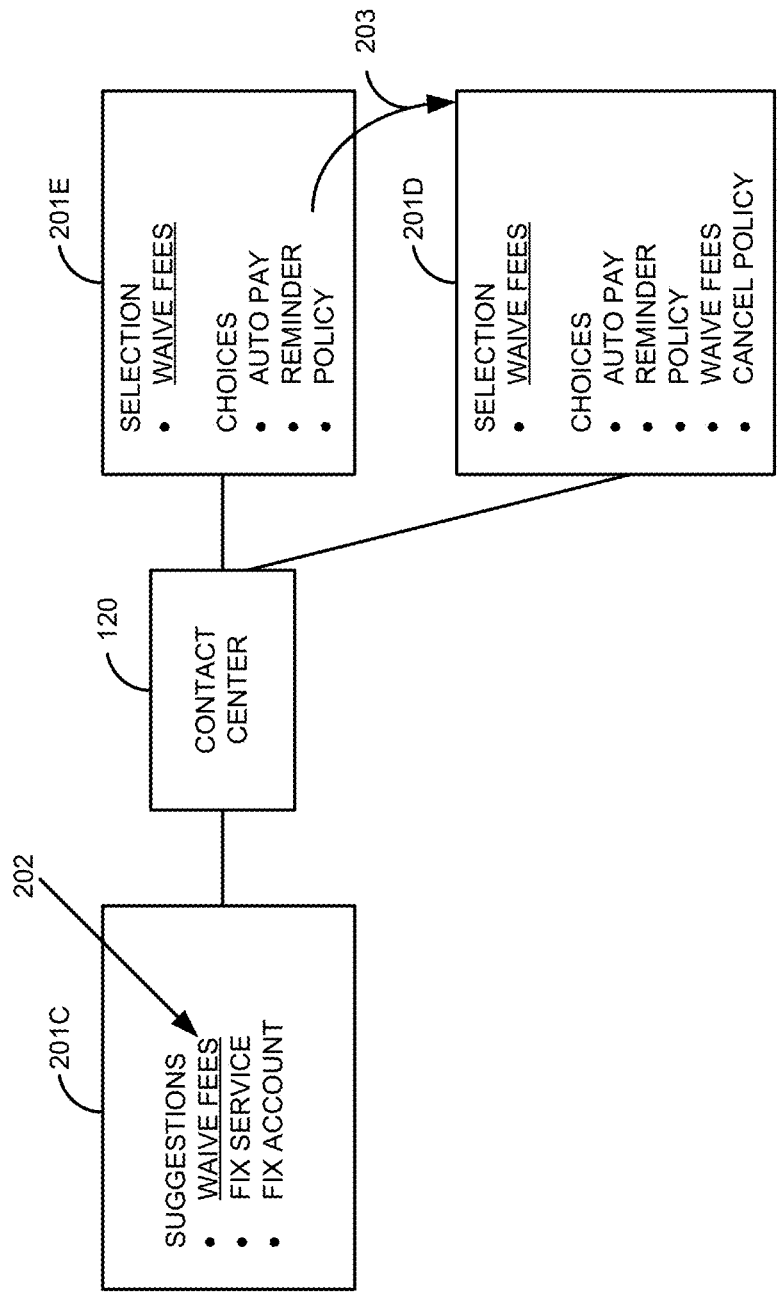
FIG. 2 is a diagram of information that is presented to a user and information that is presented to different agents based on a topic suggestion selected by the user.

FIG. 2 is a diagram of information that is presented to a user/customer and information that is presented to different agents based on a topic suggestion selected by the user. FIG. 2 comprises the contact center 120, displays 201C, 201D, and 201E. The displays 201C, 201D, and 201E represent displays on the corresponding communication endpoints 101C-101E.

As content of a communication session between the communication endpoint 101C (the user's communication endpoint) and the communication endpoint 101E (the agent's communication endpoint) is monitored, topic suggestions are generated based on the rules and the identified keywords and/or phrases associated with topics. In this example, the topic suggestions Waive Fees, Fix Service, and Fix Account have been generated and are displayed to the user of the communication endpoint 101C. The user at the communication endpoint 101C selects the waive fees topic suggestion as shown in step 202. For example, the user could select the waive fees topic suggestion by using a mouse or touch screen.

In response to the selection by the user in step 202, the topic module 124 in the contact center 120 generates for display to the agent at communication endpoint 101E the selected topic suggestion Waive Fees along with one or more discussion options associated with the selected topic suggestion waive fees. In this example, the agent is presented with the discussion options: 1) Auto pay, 2) Reminder, and 3) Policy. These discussion options remind the agent of options that are associated with waiving fees. The agent can discuss with the user that he can waive the fees if the user elects the auto pay his account. The agent is reminded that the user has a remainder in his account that can be applied to the fees. The agent is also reminded of the company's policy for these types of accounts. In one embodiment, the agent can select individual discussion options to get further information on each discussion option. For example, the agent can select the policy discussion option to bring up the company's policy statement.

As the communication session between the agent and the user progresses, the agent (or optionally the user) can elect to transfer the communication session to a second agent or conference a second agent into the communication session. For example, the agent could transfer a call to or conference in the agent's supervisor to resolve a problem with the user. In response to transferring the communication session to a second agent or conferencing the second agent into the communication session in step 203, the second agent is presented with the selected topic suggestion along with a second list of one or more topic suggestion as shown in the display 201D.

In this example, the second agent, at the communication endpoint 101D (e.g., a supervisor), has the additional discussion options of waiving fees and canceling a policy. The agent supervisor may have the additional ability to waive the fees or cancel the user's policy that the first agent does not. The second agent can then further discuss the selected topic suggestion with the user.

In this example, if the user later selected a different topic suggestion and the first agent and the agent's supervisor were conferenced, both the first agent's display 201E and the supervisor's display 201D are updated based on the selected different topic in a similar manner as for the Waive Fees topic suggestion.

In one embodiment, when the user is no longer interested in discussion of a topic, the user can select the topic suggestion and have the topic suggestion removed from the list. For example, once the user is no longer interested in discussing the topic suggestion Waive Fees, the user can select the Waive Fees topic suggestion and remove it from the list of topic suggestions. If the user deleted the currently selected topic, the displays 201D-201E are updated by removing the selected topic and the discussion options for the removed topic suggestion. If there is only a single topic selected (there may be more than one selected topic), the displays 201D-201E would indicate that the user deleted the topic and there are currently no selected topics.

Figure 3:
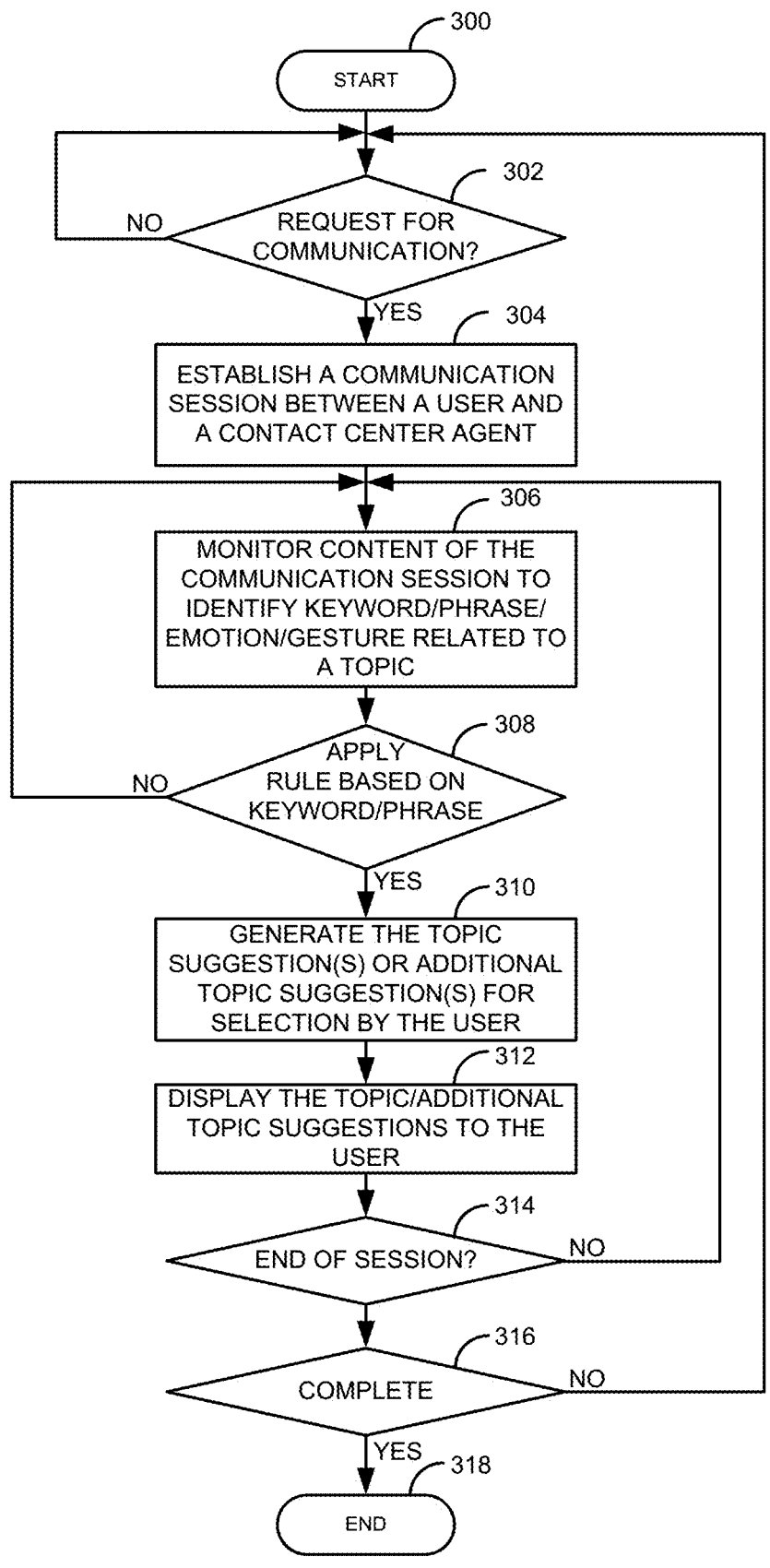
FIG. 3 is a flow diagram of a process for identifying topics in a communication session.
Figure 4:
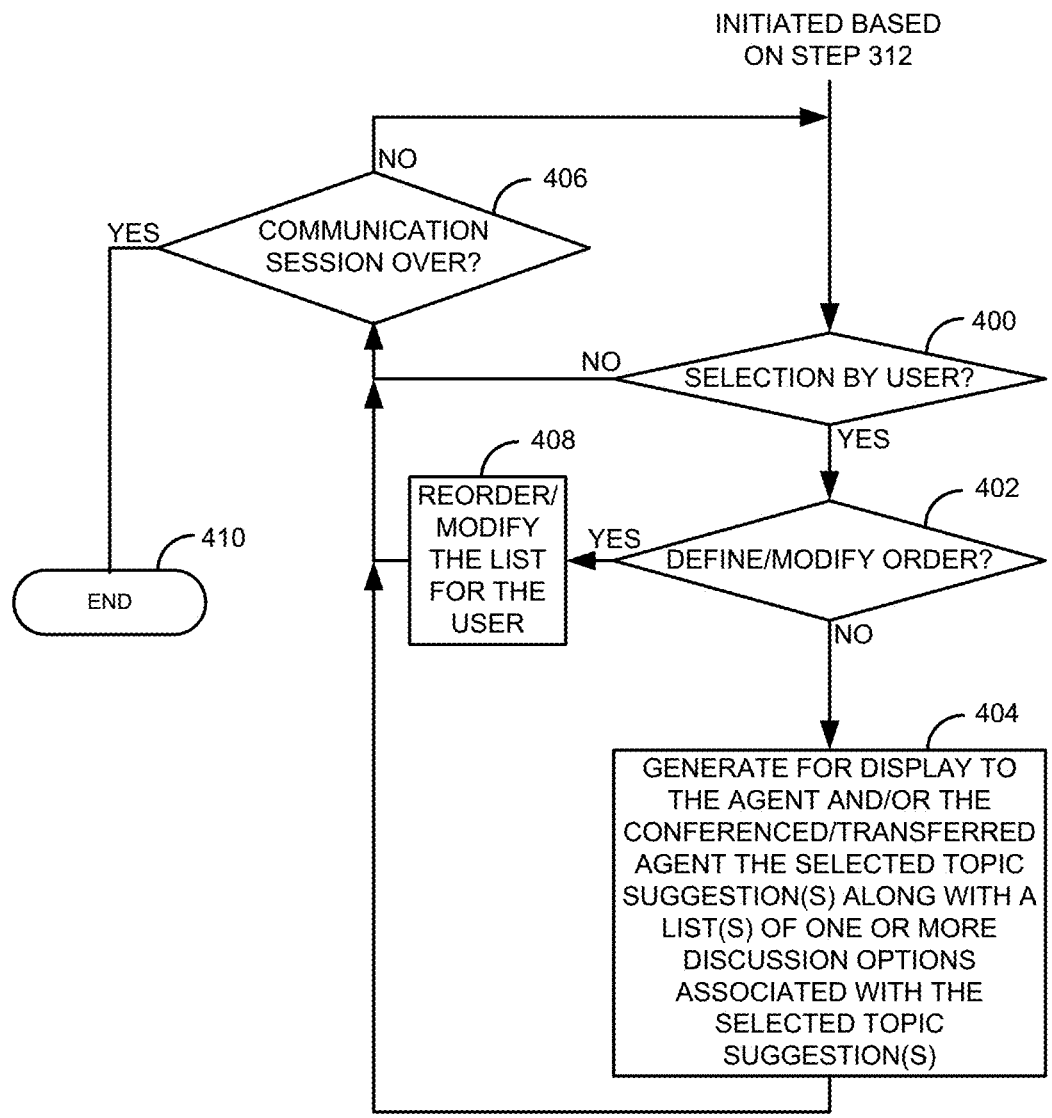
FIG. 4 is a flow diagram of a process for handling a selection of a topic suggestion by a user.
Figure 5:
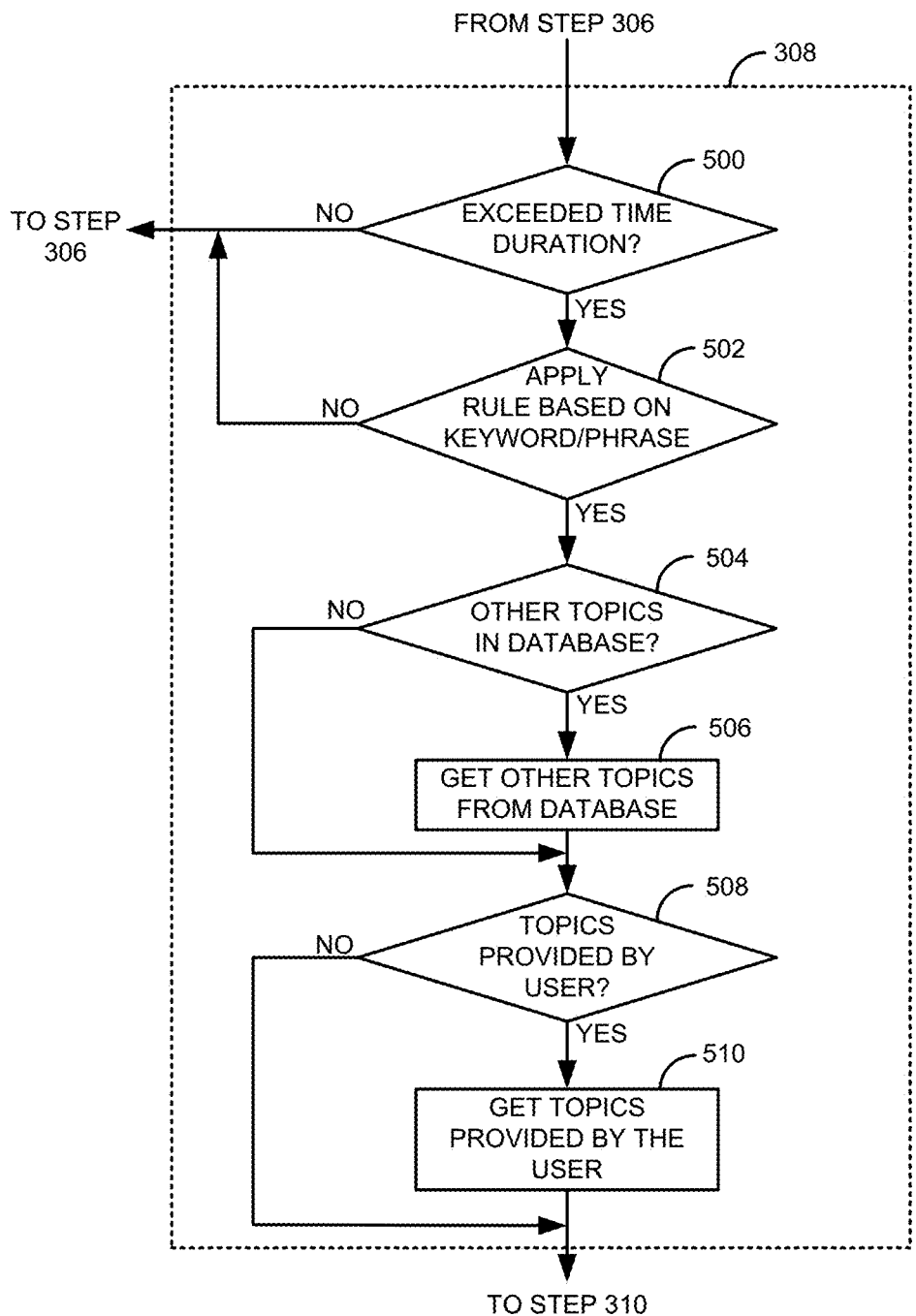
FIG. 5 is a flow diagram of a process for applying rules to topics in a communication session.

FIG. 3 is a flow diagram of a process for identifying topics in a communication session. Illustratively, the communication endpoints 101A-101E, the contact center 120, the session manager 121, the content monitor 122, the rule engine 123, the topic module 124, the presentation module 125, and the database 126 are stored-program-controlled entities, such as a computer or processor, which performs the method of FIGS. 3-5 and the processes described herein by executing program instructions stored in a tangible computer readable storage medium, such as a memory or disk. Although the methods described in FIGS. 3-5 are shown in a specific order, one of skill in the art would recognize that the steps in FIGS. 3-5 may be implemented in different orders and/or be implemented in a multi-threaded environment. Moreover, various steps may be omitted or added based on implementation.

The process starts in step 300. The process determines if a request for a communication session between a user and an agent of a contact center has been received in step 302. If request for a communication session has not been received in step 302, the process repeats step 302. Otherwise, if a request for a communication session has been received in step 302, the process establishes a communication session between the user and the contact center agent in step 304.

Content of the communication session is monitored to identify keyword(s), phrase(s), emotion(s), and/or gesture(s) related to a topic(s) in step 306. The process determines whether to apply one or more rules based on the identified keyword(s) phrase(s), emotion(s), and/or gesture(s) in step 308. If there are no rules to apply based on the monitored content of the communication session in step 308, the process goes back to step 306. Otherwise, if there are one or more rules to apply based on the identified keyword(s), phrase(s), emotion(s), and/or gesture(s) in step 308, the process goes to step 310. In step 308, the process can identify multiple topics based on identified keyword(s), phrase(s) emotion(s), and/or gesture(s). For example, over the first three minutes of a voice call, several topics could be identified in step 308 based on the monitored content of the communication session.

The process generates the topic suggestions (e.g., as shown in display 201C in FIG. 2) or additional topic suggestions for selection by the user in step 310. The process displays the topic suggestion(s)/additional topic suggestion(s) to the user in step 312. The process determines in step 314 if the communication session has ended in step 314. If the communication session has not ended in step 314, the process goes to step 306. Otherwise, if the communication session has ended in step 314, the process determines if the overall process is complete in step 316. If the overall process is not complete in step 316, the process goes to step 302 to identify a request for a new communication session. If the process is complete in step 316, the process ends in step 318.

FIG. 4 is a flow diagram of a process for handling a selection of a topic suggestion by a user. The process in FIG. 4 is initiated (i.e., by spinning off a thread) based on displaying the topic suggestion(s) to the user in step 312 of FIG. 3. The process determines in step 400 if the user has selected one or more of the topic suggestions displayed in step 312 (e.g., the Waive Fees topic suggestion in the display 201C in FIG. 2) or selected a change of order of the topic suggestions. If there has been no selection by the user in step 400, the process determines in step 406 if the communication session is over. If the communication session is over in step 406, the process ends in step 410. Otherwise, if the communication session is not over in step 406, the process goes to step 400.

If a selection of a topic suggestion has been completed or the user has selected to define or modify an order of the topic suggestions, the process determines in step 402 if the user has defined an order or wishes to modify the topic suggestions. The user can define an order of the topic suggestions in order to focus the agent on the order in which the user wants to discuss topics. For example, the user may want to reorder the topic suggestions as shown in display 201C to Fix Service, Fix Account, and Waive fees; the user can then select all three topics at once. The user can reorder the topic suggestions by using a mouse to select a reorder button, by selecting a suggestion topic and moving it into a different order, and/or the like. Alternatively, the user can modify the topic suggestion list by removing or adding a topic suggestion. The user can add topic suggestions by selecting an add suggestion button to bring up a window to add the new topic suggestion. The user can select a topic suggestion to remove the topic suggestion. If the user has defined an order or added/removed items in the order in step 402, the process reorders/modifies the list for the user in step 408. The process then goes to step 406 to determine if the communication session is over.

If the user has not defined an order in step 402, but has instead, selected one or more topic suggestions from the list, the process generates for display to the agent and/or conferenced/transferred agent the selected topic suggestion(s) along with a list(s) of one or more discussion options associated with each of the selected topic suggestion(s) in step 404. The process then goes to step 406.

If the user selected multiple topics, the selected topics along with discussion options associated with each of the selected topics can be displayed to the agent(s). For example, if the user reordered the topics in FIG. 2 to Fix Service, Fix Account, and Waive fees and selected all three topic suggestions, the agent would be shown the display 201E. In addition display 201E would include the topic suggestion Fix Service along with the discussion options for Fix Service, the topic suggestion Fix Account along with the discussion options for Fix Account, and the topic suggestion Waive Fees along with the discussion options for Waive Fees.

FIG. 5 is a flow diagram of a process for applying rules to topics in a communication session. The process shown in FIG. 6 is an exemplary process of step 308 in FIG. 3. After monitoring content of the communication session in step 306, the process determines in step 500 if a time duration has been exceeded. For example, one of the rules may require that the communication session have lasted at least five minutes before any other rules are applied. Alternatively, instead of using a time duration, a number of emails or text messages may have to be exchanged for a text based communication session. If the time duration has not been exceeded in step 500, the process goes to step 306. Otherwise, if time duration has been exceeded in step 500, the process applies the rule based on the identified keyword(s) and/or phrase(s) in step 502. If there are no rules to apply based on the keyword(s) and/or phrase(s) in step 502, the process goes to step 306.

Otherwise, if there are rule(s) to apply based on the identified keyword(s) and/or phrase(s) in step 502, the process determines in step 504 if there are other topics stored in a database. For example, the user may have previously made a call to the contact center and discussed a different topic. The topic discussed previously can be presented to the user as a topic suggestion in addition to the topics generated from monitoring content of the communication session in step 310. If there are no other topics in the database in step 504, the process goes to step 508. Otherwise, if there are other topics in the database in step 504, the process gets the other topics from the database in step 506 for presenting to the user as topic suggestions.

The process determines if there are any topics provided by the user prior to the initiation of the communication session. For example, the user can be asked to provide a list of topics via a graphical user interface prior to initiating a communication session with the agent. In one embodiment, the user can provide topics via an IVR system prior to contacting the agent. If there are no topics provided by the user in step 508, the process goes to step 310. Otherwise, if there are topics provided by the user in step 510, the process gets the topics provided by the user in step 510. The topics provided by the user can be included with the topic suggestions generated in step 310.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method, comprising:
monitoring, by a processor, content of a communication session between a first user at a first communication endpoint and a first agent of a contact center at a second communication endpoint;
identifying, by the processor, at least one identified topic included in the monitored content of the communication session;
in response to applying a rule based on the at least one identified topic, generating, by the processor a plurality of topic suggestions;
sending, by the processor, the plurality of topic suggestions for presentation to the first user on the first communication endpoint;

receiving, by the processor, a selection, by the first user, of one of the plurality of topic suggestions; and sending, by the processor, for presentation on the second communication endpoint, the selected one of the plurality of topic suggestions and a first list of one or more discussion options associated with the selected one of the plurality of topic suggestions.

2. The method of claim 1, further comprising transferring, by the processor, the communication session to a second agent or conferencing the second agent into the communication session; and in response to transferring the communication session to the second agent or conferencing the second agent into the communication session, generating for presentation, by the processor, to the second agent, a selected one of the plurality of topic suggestions along with a second list of one or more discussion options associated with the selected one of the plurality of topic suggestions, wherein the second list contains at least one discussion option not included on the first list.

3. The method of claim 1, further comprising: identifying, by the processor, a second topic suggestion from information stored in a database and wherein generating the plurality of topic suggestions for selection by the first user further comprises generating the second topic suggestion for selection by the first user.

4. The method of claim 1, wherein an additional plurality of topic suggestions are identified by the first user prior to an initiation of the communication session.

5. The method of claim 1, wherein applying the rule based on the at least one identified topic is further based on the first agent discussing a different topic.

6. The method of claim 1, wherein at a conclusion of the communication session, information associated with the communication session is stored in a database for use with further communication sessions associated with the first user.

7. The method of claim 1, wherein the plurality of topic suggestions are generated based on detecting a defined number of keywords and/or phrases and/or emotions and/or gestures identified with the at least one identified topic and wherein the plurality of topic suggestions are presented to the first user.

8. The method of claim 1, wherein the rule is applied based on the identified at least one identified topic being at least one of a keyword, a phrase, an emotion, or a gesture, and an exceed time duration of the communication session.

9. The method of claim 1, wherein applying the rule based on the at least one identified topic is based on the at least one identified topic being communicated within a specific time period.

10. The method of claim 1, wherein applying the rule based on the at least one identified topic is based on the at least one identified topic.

11. The method of claim 1, wherein a second agent has an additional ability not available to the first agent.

12. A system comprising:
a content monitor, executed by a processor, that monitors content of a communication session between a first user at a first communication endpoint and a first agent of a contact center at a second communication endpoint, and identifies at least one identified topic in the monitored content of the communication session;
a topic module, executed by the processor that generates a plurality of topic suggestions for selection by the first user in response to applying a rule based on the at least one identified topic, sends the plurality of topic suggestions to the first communication endpoint, and receives, from the first communication endpoint, a selection, by the first user, of one of the plurality of topic suggestions;
a session manager, executed by the processor that transfers the communication session to a second agent or conferences the second agent into the communication session; and
a presentation module, executed by the processor, that generates, for presentation on the second communication endpoint, the selected one of the plurality of topic suggestions and a first list of one or more discussion options associated with the selected one of the plurality of topic suggestions, and generates for presentation, to the second agent, the selected one of the plurality of topic suggestions.

13. The system of claim 12, wherein the rule is applied based on the at least one identified topic, and an exceed time duration of the communication session.

14. The system of claim 12, wherein:
the topic module identifies a second topic suggestion from information stored in a database; and
the presentation module generates for presentation to the first user the second topic suggestion for selection by the first user.

15. The system of claim 12, wherein applying the rule to the at least one identified topic is further based on one of the following:
the first agent is not understanding the at least one identified topic;
the first agent discussing a different topic;
two or more specific individuals calling in from a single communication endpoint;
the at least one identified topic being in a single email or text message;
the at least one identified topic being communicated a number of times;
a non response to an Interactive Voice Response (IVR) system;
the at least one identified topic being an abbreviation;
a number of exchanged emails or text messages;
a gesture made during the communication session; or
a detected emotion of a specific individual communicating in the communication session.

16. The system of claim 15, wherein the at least one identified topic is based on the first agent not understanding the at least one identified topic.

17. The system of claim 15, wherein the at least one identified topic is based on the at least one identified topic being the abbreviation.

18. The system of claim 15, wherein the at least one identified topic is based on the number of exchanged emails or text messages.

19. The system of claim 12, wherein the second agent has an additional ability not available to the first agent.

20. The system of claim 12, further comprising applying the rule to the at least one identified topic is based on a specific type of punctuation being used with a specific at least one word.

* * * * *

UNITED STATES PATENT AND TRADEMARK OFFICE
CERTIFICATE OF CORRECTION

PATENT NO. : 11,632,464 B2
APPLICATION NO. : 14/258848
DATED : April 18, 2023
INVENTOR(S) : Isaac K. Eyeson It is certified that error appears in the above-identified patent and that said Letters Patent is hereby corrected as shown below:

In the Claims

At Column 9, Line 14, Claim 2, after "to the second agent," please delete "a" and insert --the-- therein.

At Column 9, Line 44, Claim 8, after "at least one" delete "identified topic being at least one".

At Column 9, Line 45, Claim 8, after "of" delete "a" and insert --the-- thereof.

At Column 9, Line 45, Claim 8, after "keyword," delete "a" and insert --the-- therein.

At Column 9, Line 45, Claim 8, after "phrase," delete "an" and insert --the-- therein.

At Column 9, Line 45, Claim 8, after "or" delete "a" and insert --the-- therein.

At Column 9, Line 54, Claim 11, delete "a" and insert --the-- therein.

At Column 10, Line 16, Claim 12, after "suggestions," delete "and".

At Column 10, Line 49, Claim 16, after "the first agent" insert --is-- therein.

At Column 10, Line 51, Claim 16, please delete "at least one identified" therein.

Signed and Sealed this
Fifth Day of September, 2023

*Katherine Kelly Vidal*
Katherine Kelly Vidal
*Director of the United States Patent and Trademark Office*